June 28, 1949.                    D. H. MURPH                    2,474,591
                                   NUTCRACKER
                                Filed April 1, 1946
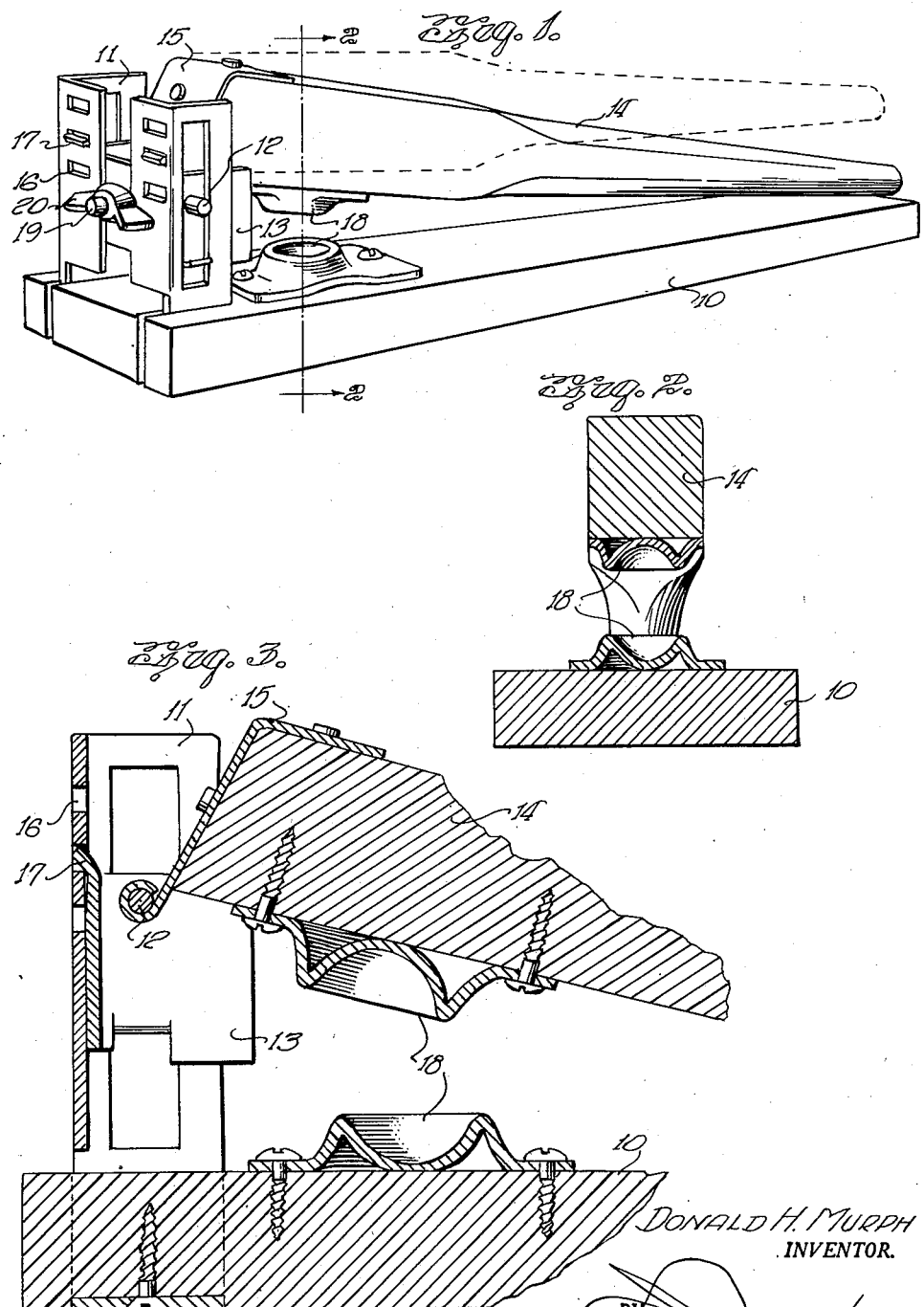
Donald H. Murph
INVENTOR.
BY
ATTORNEY Patented June 28, 1949

2,474,591

UNITED STATES PATENT OFFICE 2,474,591

NUTCRACKER

Donald H. Murph, Dallas, Tex.

Application April 1, 1946, Serial No. 658,786

3 Claims. (Cl. 146—13)

1

This invention relates to mechanical means for breaking the shell enclosing edible nut meats and more particularly to means adaptable for crushing or breaking the shell of a pecan, walnut, or other shells of similar inflexibility.

The conventional types of appliances adaptable for use in breaking nutshells are capable of greatest efficiency in a comparatively small range of sizes, and in some of these the leverage required to break shells of extreme hardness is not considered in the design.

This invention is designed to accommodate a variety of sizes in nutshells with sufficient leverage to crush those of extreme hardness with comparative ease. The flexibility in permissible sizes is accomplished by a series of rectilinear perforations in a substantially U-shaped frame admitting projections of a traveling frame therein as will be hereinafter more fully described.

The principal object of the invention is to provide a mechanical means of cracking or breaking the enclosing shells of edible nut meats.

Another object of the invention is to provide a means of adaptability to accommodate nut shells of a variety of sizes.

Still another object of the invention is to provide sufficient leverage to break shells of extreme hardness.

A further object of the invention is to provide a pair of concave receptacles capable of retaining a nut shell in position while applying the necessary leverage for breakage.

With the foregoing objects as paramount, the invention has further reference to certain features of accomplishment which will become increasingly apparent as the description proceeds, taken in connection with the accompanying drawings, wherein:

Figure 1 is a perspective view of a device for breaking nut shells, constructed according to the invention.

Figure 2 is an end elevational view in vertical section, taken on line 2—2 in Figure 1, and Figure 3 is a fragmentary side elevational view in vertical section to illustrate the construction details of the invention.

Continuing with a more detailed description of the drawings, reference numeral 10 designates a solid base, slotted as indicated in Figures 1 and 3 to receive a U-shaped frame 11 affixed thereto. The sides of the frame 11 are slotted to receive loosely a pin 12 and a protruding portion of a traveling frame 13, the pin 12 serving as a pivot for a lever 14, being connected thereto by a strap 15, as shown in Figure 3. Rectilinear perforations 16 in the U-shaped frame 11 are adapted to receive flared protruding lugs 17 of the traveling frame 13 for the purpose of varying the capacity of the concave receptacle jaws 18.

A bolt 19, affixed to the traveling frame 13, extends through a slot in the U-shaped frame 13. A wing nut 20, acting upon the bolt 19, permits the traveling frame 13 to be placed in comparatively secure relationship with the U-shaped frame 11. This action, in conjunction with the pivot pin 12, forms a fulcrum for the lever 14.

The receptacle jaws 18 are affixed in opposing relationship upon the base 10 and the lever 14 to receive and retain in placement whole nut shells in preparation for breakage. In operation, the lever 14 is elevated, a whole nut is placed in the jaws 18, and the lever 14 is forcibly lowered until the shell is broken.

Manifestly, the construction as shown and described is capable of some modification, and such modification as may be construed to fall within the scope and meaning of the appended claims is also considered to be within the spirit and intent of the invention.

What is claimed is:

1. A nut shell cracker comprising a base having a concave receptacle affixed thereon, a U-shaped frame affixed adjacent an end of said base and perpendicular thereto, having slots in the sides thereof and rectilinear perforations in the face thereof, a perpendicularly adjustable unit slidable within said frame, having extrusions for slidable engagement within said slots and being a guide for said unit, and additional extrusions capable of rigid engagement within said rectilinear perforations, means for sustaining said adjustable unit in rigid proximity with said frame, a pivoting means laterally of said adjustable unit and extending through said slots in the sides of said frames and being an additional guide for said unit, a lever pivoted on said pivoting means, capable of vertical movement, and a concave receptacle affixed subjacent thereto for reciprocal action with said receptacle affixed to said base.

2. In a nut cracker, a horizontal rectilinear base, a U-shaped frame affixed perpendicularly to said base at one end thereof and having spaced apart groups of transverse, vertically spaced slots therein, a traveling frame slidable within said U-shaped frame having spaced apart lugs receivable selectively in opposing slots of said spaced apart groups of slots to secure said traveling frame in adjusted positions with respect to said first frame, a pin extending transversely through said traveling frame, a lever attached to said pin and capable of free movement perpendicular to said base, and a pair of cooperatively aligned concave receptacles affixed to said base and said lever to receive a nut for cracking therebetween.

3. A nut cracker including a base, a substantially U-shaped frame affixed adjacent one end of said base and perpendicular thereto, said frame having spaced apart groups of transverse, vertically aligned slots therein, a traveling frame slidable within said U-shaped frame, lugs on said traveling frame receivable selectively in the slots of said spaced apart groups to hold said traveling frame against upward displacement, a lever pivoted to said traveling frame, and a pair of cooperating, nut receiving receptacles, one being affixed to the under surface of said lever and the other affixed to said base.

DONALD H. MURPH.

REFERENCES CITED

The following references are of record in the file of this patent:

UNITED STATES PATENTS

| Number | Name | Date |
|---|---|---|
| 1,246,397 | DeMing | Nov. 13, 1917 |
| 1,355,912 | Robbins | Oct. 19, 1920 |
| 1,431,651 | Goldman | Oct. 10, 1922 |
| 1,743,449 | Goodell | Jan. 14, 1930 |
| 2,115,062 | Darling | Apr. 26, 1938 |